United States Patent
Burchill et al.

(10) Patent No.: US 6,763,677 B1
(45) Date of Patent: Jul. 20, 2004

(54) FRESH AIR VENT POSITION MONITORING SYSTEM

(75) Inventors: Jeffrey J. Burchill, Syracuse, NY (US); William J. Heffron, Syracuse, NY (US); Lawrence J. Vivirito, Cazenovia, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 10/689,160

(22) Filed: Oct. 20, 2003

(51) Int. Cl.[7] .............................................. F25D 17/06
(52) U.S. Cl. ...................... 62/427; 62/129; 62/176.1; 62/440
(58) Field of Search ............................... 62/129, 176.1, 62/176.6, 200, 404, 427, 440

(56) References Cited

U.S. PATENT DOCUMENTS

| | | | | |
|---|---|---|---|---|
| 5,369,957 A | * | 12/1994 | Hanson | 62/126 |
| 5,743,109 A | * | 4/1998 | Schulak | 62/428 |
| 5,899,083 A | * | 5/1999 | Peterson et al. | 62/186 |

* cited by examiner

Primary Examiner—Melvin Jones

(57) ABSTRACT

A refrigeration container is provided with a manually operated fresh air vent with a position sensor which provides a signal to the microprocessor based controller indicative of the position of the fresh air vent. The fresh air vent controls both the providing of fresh air to the circulating air in the container and the exhausting a portion of the circulating air. The evaporator fan is run continuously when the air vent is open to prevent the build up of gases produced by the perishable cargo.

10 Claims, 5 Drawing Sheets

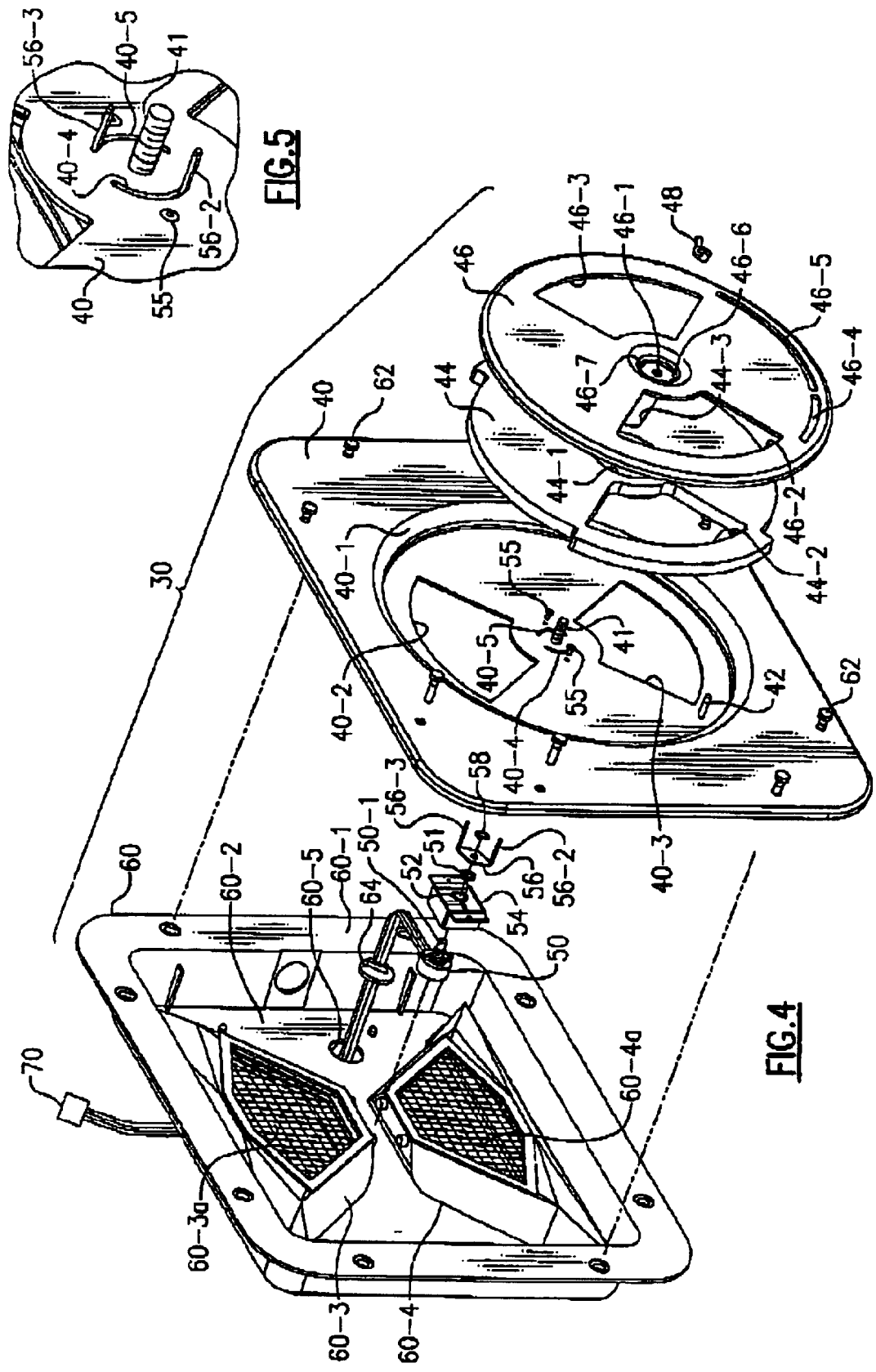

FRESH AIR VENT POSITION MONITORING SYSTEM

BACKGROUND OF THE INVENTION

Container refrigeration units are controlled by a microprocessor which receives inputs indicating the temperature, humidity, etc. in the conditioned space and controls the refrigeration system responsive to the inputs. Additionally, the microprocessor records the inputs such that the history of the load during the trip is recorded. Accordingly, it is possible to determine when and why a load is spoiled, thawed or the like. Perishable cargo such as fruit, vegetables and flowers produce, and are affected by, gases. Ethylene, for example, is produced in the ripening of bananas and its presence promotes ripening. It is therefore necessary to introduce some fresh air with the recirculating air, where perishable cargo is present, if spoilage or premature ripening of the load is to be avoided.

In a container, the load normally occupies all of the available space such that the flow paths for the conditioned air are located in the floor, ceiling and walls of the container and are often at least partially defined by the load. To minimize the wastage of conditioned space, only the expansion device, the evaporator, the evaporator fan, necessary ducting and sensors are located in the conditioned space. The rest of the refrigeration unit and its controls are located on the exterior of the container and are powered by an external power supply.

SUMMARY OF THE INVENTION

In the present invention a manually operated fresh air vent is provided to introduce some ambient/fresh air into the air circulating in the container and to exhaust some air from the container such as is done to provide some fresh air in commercial buildings. When the temperature setting is above freezing, or another temperature indicative of a perishable load, the condenser fan is run continuously independent of the operation of the refrigeration system when the fresh air vent is open. The fresh air vent position sensor of the present invention continuously senses the position of the fresh air vent in the refrigeration container unit. The microprocessor based controller of the refrigeration container unit automatically records the time and position of the fresh air vent as well as the evaporator fan speed. In a preferred embodiment, mechanically keyed tangs transfer mechanical movement of the fresh air door to a rotary electronic sensor such as a sealed Hall effect sensor. The rotary electronic sensor has a output voltage proportional to its mechanical position and its output voltage is used by the controller to determine the position of the fresh air vent door. Relative to the fresh air vent, the microprocessor stores the manual vent position change, the trip start vent position, the power on vent position and the midnight or other periodic logging of the vent position.

It is an object of this invention to monitor the opening, closing and position of a manually actuated vent.

It is another object of this invention to selectively provide a continuous supply of fresh air to a perishable cargo.

It is a further object of this invention to provide a sensor which cannot be improperly assembled as to its position and requires no mechanical calibration. These objects, and others as will become apparent hereinafter, are accomplished by the present invention.

Basically, a refrigeration container is provided with a manually operated fresh air vent with a position sensor which provides a signal to the microprocessor based controller indicative of the position of the fresh air vent. The fresh air vent controls both the providing of fresh air to the circulating air in the container and the exhausting of a portion of the circulating air. The evaporator fan is run continuously when the air vent is open to prevent the build up of gases produced by the perishable cargo.

BRIEF DESCRIPTION OF THE DRAWINGS

For a fuller understanding of the present invention, reference should now be made to the following detailed description thereof taken in conjunction with the accompanying drawings wherein:

FIG. 4 is an exploded view of the fresh air vent structure of FIG. 3;

FIG. 5 is an enlarged view of a portion of the FIG. 4 structure partially assembled.

DESCRIPTION OF THE PREFERRED EMBODIMENTS

Figure 1:
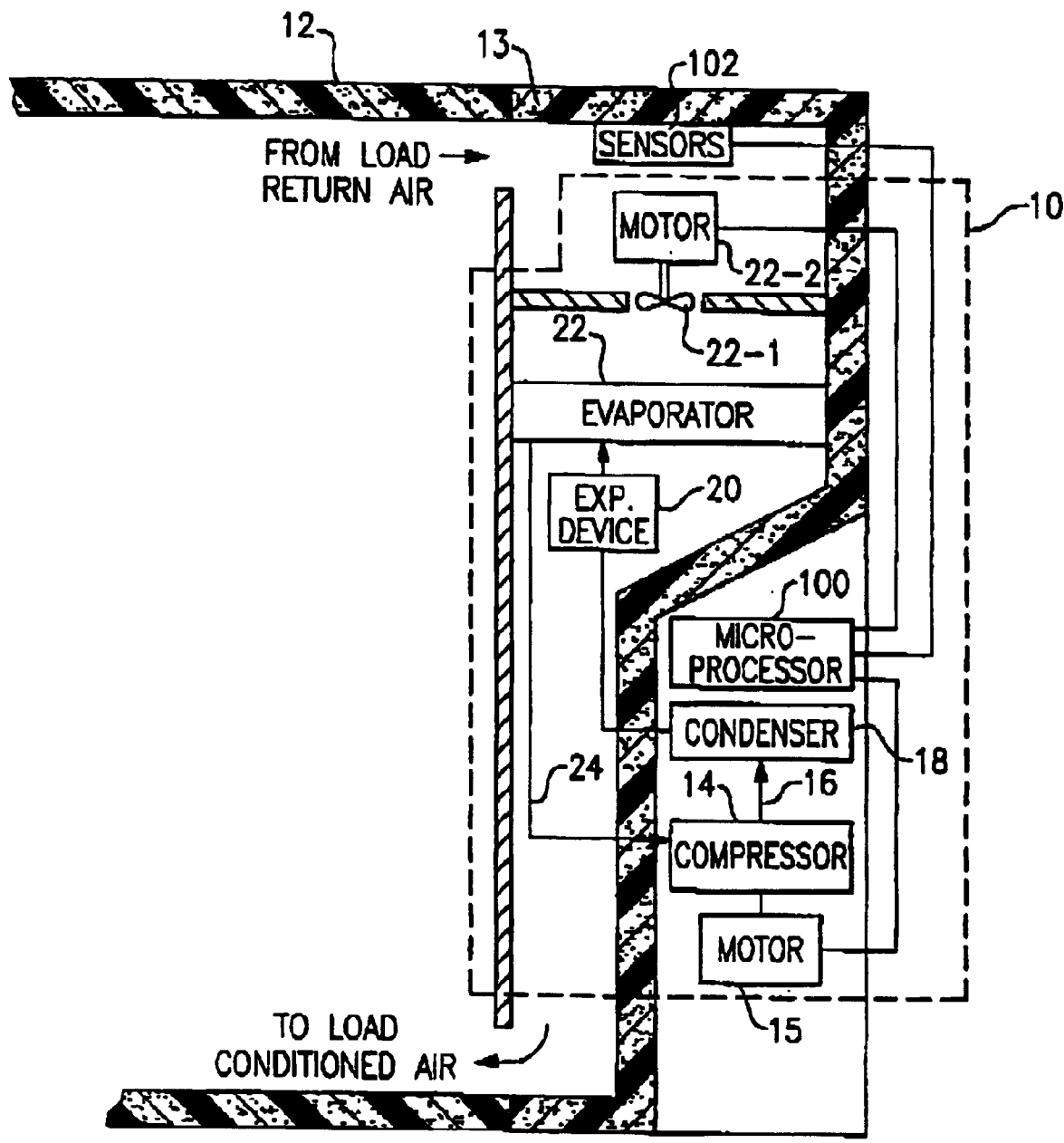
FIG. 1 is a simplified schematic diagram of a container and its refrigeration unit.

In FIG. 1, the numeral 10 generally designates a refrigeration unit which is mounted in a recess on a container 12. Insulation 13 lines container 12 and separates the portions of refrigeration unit 10 which are located in container 12 from the portions located external to the conditioned area. Refrigeration unit 10 includes a fluid circuit serially including compressor 14, discharge line 16, condenser 18, expansion device 20, evaporator 22 and suction line 24. Compressor 14 is driven by motor 15 under the control of microprocessor 100 responsive to inputs from sensors 102 which includes sensors for temperature, humidity, etc. The expansion device 20, evaporator 22, evaporator fan 22-1 and evaporator fan motor 22-2 are located within container 12. Evaporator fan motor 22-2 operates under the control of microprocessor 100 and causes conditioned air from evaporator 22 to be distributed through container 12 and return air to be delivered back to evaporator 22. Although evaporator fan motor 22-2 is controlled by microprocessor 100, it is not powered by microprocessor 100 but, rather by a generator, or the like, as is conventional. To the extent that structure is illustrated in FIG. 1 and described it is generally conventional.

Figure 2:
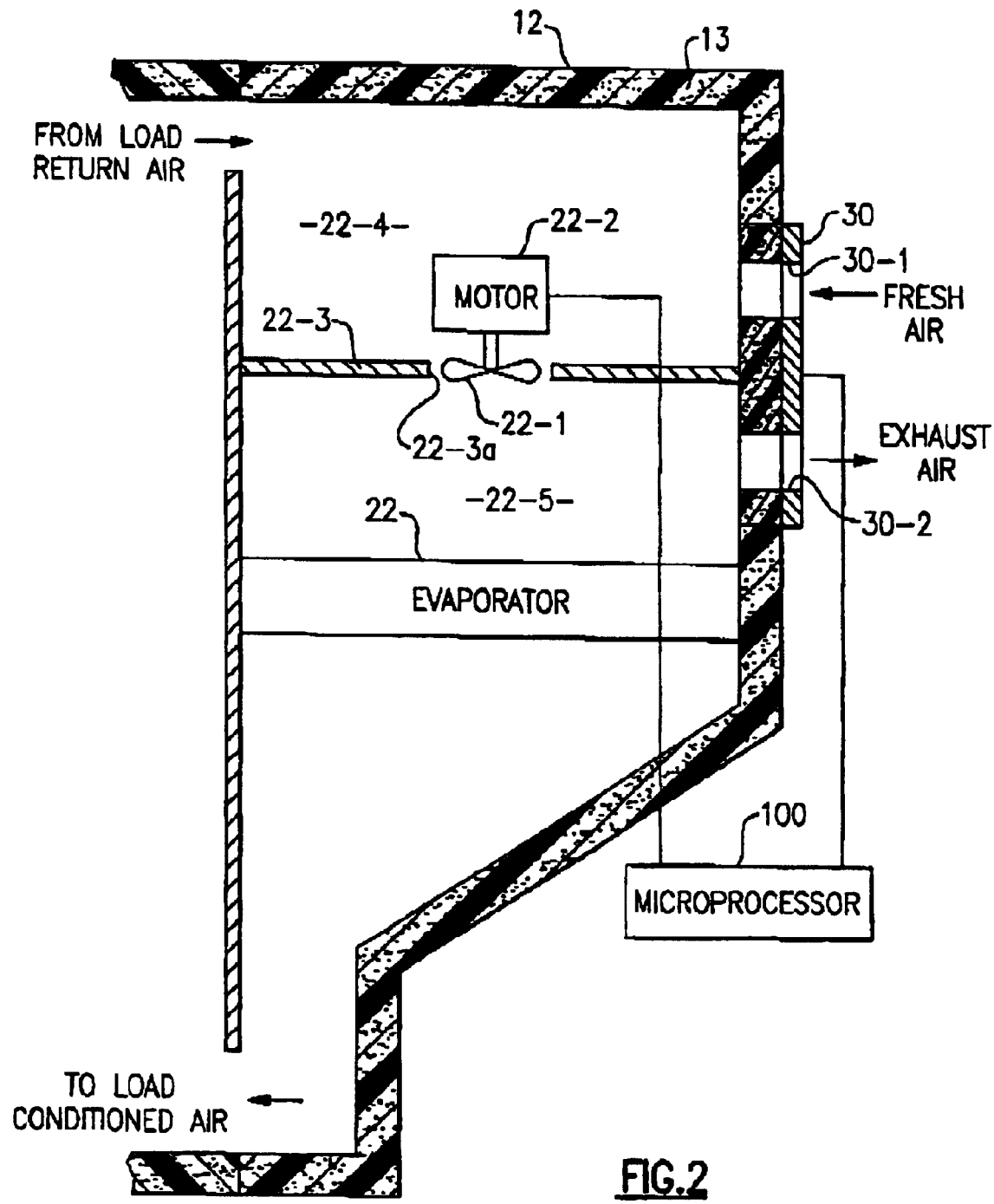
FIG. 2 is a simplified schematic representation of the fresh air vent structure.

FIG. 2 is a more detailed depiction of a portion of the FIG. 1 system adding details of the fresh air vent structure which is collectively labeled 30. As will be described in detail below, air vent structure 30 includes a pair of valves which control two restricted flow paths, 30-1 and 30-2, between the interior of refrigeration unit 10 and the surrounding atmosphere. Restricted flow paths 30-1 and 30-2 are illustrated as open. As noted with respect to FIG. 1, evaporator fan motor 22-2 operates under the control of microprocessor 100 and causes conditioned air from evaporator 22 to be distributed through container 12 and to be delivered back to evaporator 22. If the container 12 contains a perishable cargo that produces gas(es) the air circulating in the container will contain the gas(es).

While it is desirable to remove the gas(es) produced by the cargo to retard ripening etc., its exhausting represents a loss in that it is at a temperature typically less than ambient and within a very narrow temperature range in order to maximize the quality of the load. However, since a perishable load such as flowers or produce, typically, is kept at about 40° F. which is about mid-range for normally encountered ambient temperatures, the temperature difference between the load and ambient does not present a serious energy loss in the practice of the present invention. Fresh air vent structure 30 is manually adjusted to simultaneously open or close the two restricted flow paths 30-1 and 30-2. The evaporator fan 22-1 is located in opening 22-3*a* of fan deck 22-3 and when operating coacts therewith to separate chamber 22-4 from chamber 22-5 such that chamber 22-4 is at fan suction pressure and chamber 22-5 is at fan discharge pressure. Note that both chambers 22-4 and 22-5 are upstream of evaporator 22. The first flow path 30-1 connects to the return air path just upstream of evaporator fan 22-1 and, when open, permits a selected portion of fresh air to enter chamber 22-4. The supplying of a portion of atmospheric air through restricted flow path 30-1 is possible because the pressure in chamber 22-4 is less than ambient pressure. The second flow path 30-2 connects to the return air path just downstream of evaporator fan 22-1 and fan deck 22-3 and permits a selected portion of return air to be discharged into the atmosphere since chamber 22-5 is at fan discharge pressure which is above ambient. The degree of opening of the valves of fresh air vent structure 30 coacts with the speed of evaporator fan 22-1 to determine the amount of air being exhausted and supplied. Microprocessor 100 is connected to and controls evaporator fan motor 22-2 and is connected to the position sensor 50 of fresh air vent structure 30 and is therefore capable of recording the supplying of fresh air during a trip.

Figure 3:
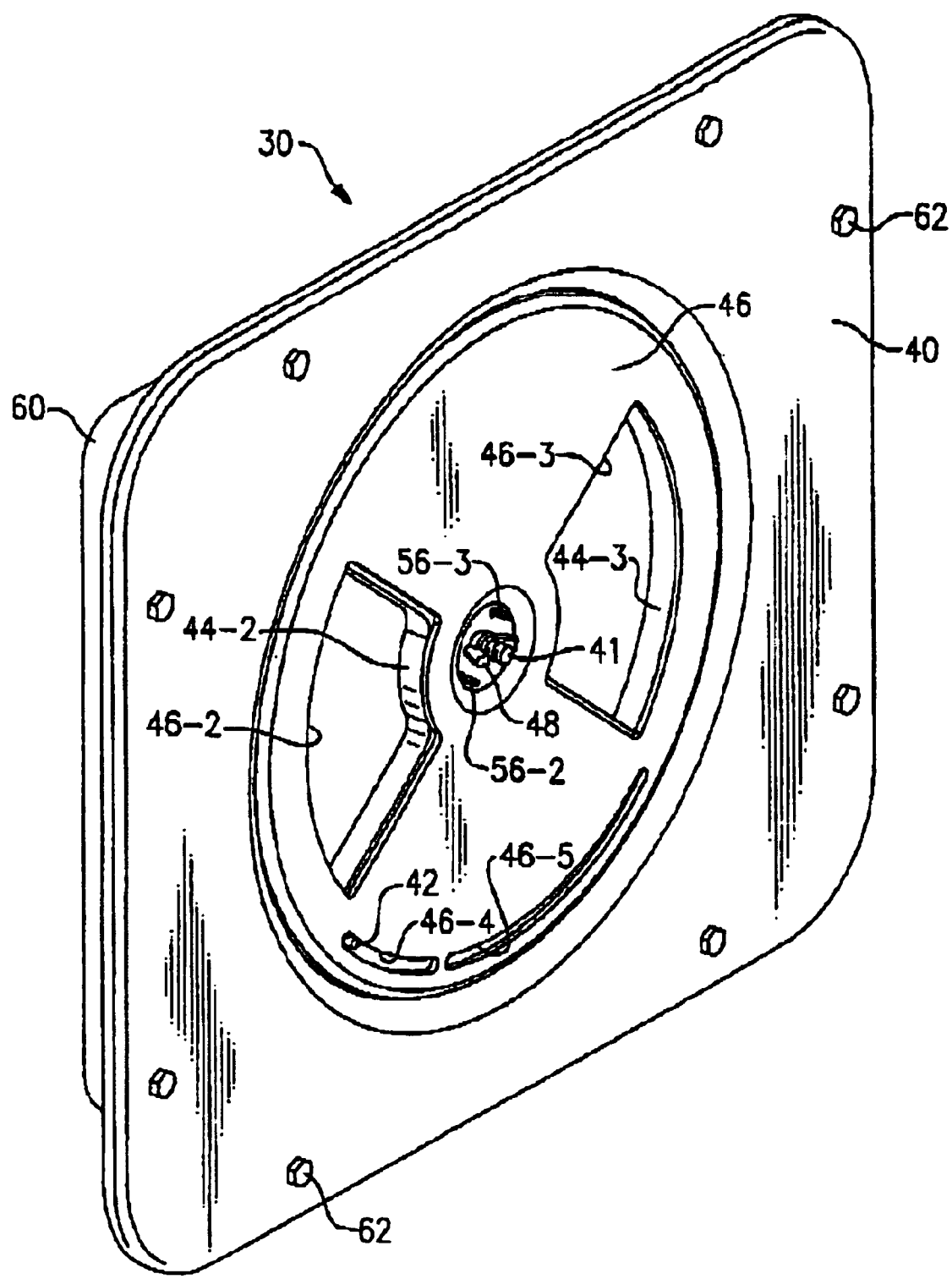
FIG. 3 is a pictorial view of the assembled fresh air vent structure.

Referring specifically to FIGS. 3 and 4, fresh air vent structure 30 includes a cover 40 which is typically made of metal. A threaded shaft 41 is suitably secured to cover 40 and extends axially outwardly therefrom. A circular recess 40-1 is formed in cover 40 and two radially spaced openings or ports 40-2 and 40-3 are formed in recess 40-1. A pin 42 is secured in recess 40-1 radially outward of port 40-3. Foam insulation 44 has a central opening 44-1 and two ports 44-2 and 44-3 which correspond to ports 40-2 and 40-3, respectively. Door, or disc, 46 has a central opening 46-1 for receiving threaded shaft 41. Door, or disc, 46 has two ports 46-2 and 46-3 which correspond to ports 44-2 and 44-3, respectively, of foam insulation 44 which is secured to door 46 such that ports 44-2 and 44-3 are in registration with ports 46-2 and 46-3, respectively. Door 46 has a pair of arcuate slots 46-4 and 46-5 for receiving pin 42. Taken together slots 46-4 and 46-5 extend over approximately 90° with slot 46-4 having a lesser arcuate extent than slot 46-5.

With pin 42 in either slot 46-4 or slot 46-5 and threaded shaft 41 extending through openings 44-1 and 46-1, foam 44 and door 46 are secured to cover 40 by nut 48 threaded on shaft 41. Rotation of foam 44 and door 46 as a unit produces a valving action as ports 44-2 and 46-2 are moved into and out of registration with port 40-2. A corresponding valving action takes place as ports 44-3 and 46-3 are moved into and out of registration with port 40-3. Pin 42 coacting with either slot 46-4 or slot 46-5 limits the rotary movement of door 46 with respect to cover 40. Slot 46-4 controls the movement of door or disc 46 between closed and partially open whereas slot 46-5 controls the movement of door 46 between partially open and fully open. Tub 60 is typically made of plastic and has a peripheral flange 60-1 to permit the attachment of cover 40 thereto as by bolts or other suitable fasteners 62. Tub 60 has a recess 60-2 formed therein and two spaced, raised portions 60-3 and 60-4, respectively, extending outwardly from the bottom of recess 60-2. The outer portion of raised portions 60-3 and 60-4 define grilled openings 60-3*a* and 60-4*a*, respectively. When cover 40 is secured to tub 60 grilled openings 60-3*a* and 60-4*a* are in registration with ports 40-2 and 40-3, respectively.

Figure 6:
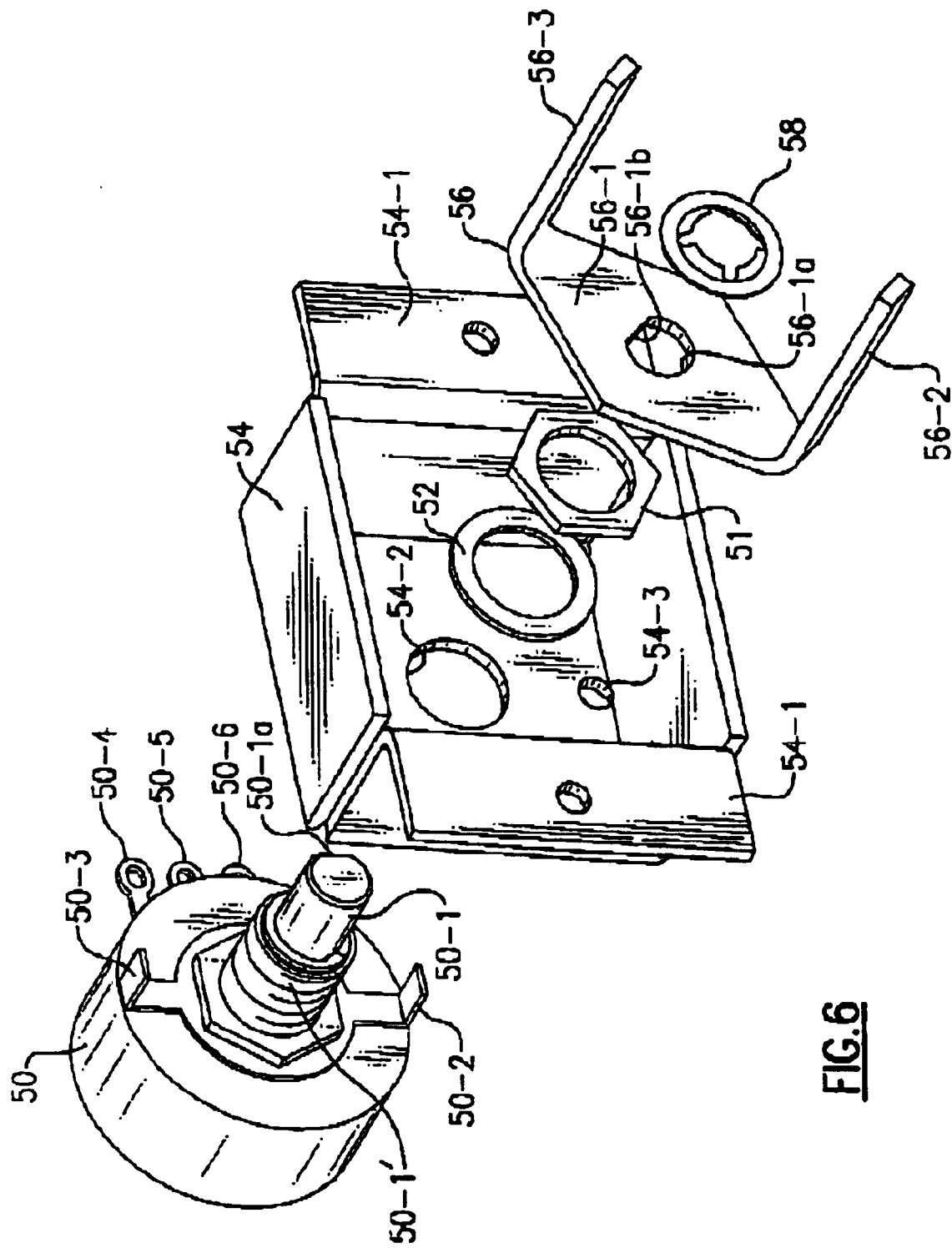
FIG. 6 is an enlarged view of a portion of the FIG. 4 structure.

Referring specifically to FIGS. 4 and 6, Hall effect sensor 50 has a shaft 50-1 with a flat surface 50-1*a* such that shaft 50-1 has a D-shape in section. Sensor 50 is suitably secured in rectangular box 54 by nut 51 and washer 52. Box 54 has flanges 54-1 which are suitably secured to cover 40 as by rivets 55. U-shaped member 56 has a base portion 56-1 with an opening 56-1*a* therein having a flat portion 56-1*b* corresponding to flat surface 50-1*a* of shaft 50-1. When shaft 50-1 is received in opening 56-1*a*, U-shaped member 56 rotates with shaft 50-1. Nut 58 secures U-shaped member 56 on shaft 50-1. Arms 56-2 and 56-3 define tangs. Tangs 56-2 and 56-3 extend through arcuate slots 40-4 and 40-5, respectively, in cover 40 so as to be freely movable with respect thereto, as best shown in FIG. 5. Tangs 56-2 and 56-3 are received in openings 46-6 and 46-7, respectively, of door 46.

Shaft 50-1 of Hall effect sensor 50 has a rotational range of about 130° so that the 90° of the combined range of slots 46-4 and 46-5 is less than the rotational range of shaft 50-1. In assembling air vent structure 30, shaft portion 50-1, threaded shaft portion 50-1' and members 50-2 and 50-3 extend through bores 54-2 and 54-3 and a bore not illustrated such that sensor 50 is accurately located with respect to box 54. Washer 52 is then placed on threaded shaft 50-1' and nut 51 is threaded on shaft 50-1' securing sensor 50 to box 54. U-shaped member 56 is placed on shaft 50-1 with flat 50-1*a* and flat portion 56-1*b* coacting to angularly locate U-shaped member 56 with respect to shaft 50-1. Nut 58 is then placed on shaft 50-1 to secure U-shaped member 56 thereon. Box 54 is riveted to cover 40 by rivets 55 as best shown in FIGS. 4 and 5. Hall effect sensor 50 has a plurality of leads 50-4, 50-5 and 50-6 which are located on one side of sensor 50. Grommet 64 is located in opening 60-5 of tub 60. Electrical connection 70 is connected to leads 50-4, 50-5 and 50-6 and passes through grommet 64. The location of leads 50-4, 50-5 and 50-6 on one side of sensor 50, the location of opening 60-5 on one side of tub 60 and the limited rotation of shaft 50-1 ensure proper assembly.

Tangs 56-2 and 56-3 are inserted through arcuate slots 40-4 and 40-5, respectively. Cover 40 is secured to tub 60 by bolts 62. Foam insulation 44 is secured to door 46 such that ports 44-2 and 44-3 are in registration with ports 46-2 and 46-3, respectively. Foam insulation 44 and door 46 are selectively and changeably located on cover 40 in accordance with the amount of fresh and exhaust air desired. If the desired range is from closed to partially open, foam insulation and door 46 are placed such that threaded shaft 41 extends through openings 44-1 and 46-1, tangs 56-2 and 56-3 are inserted in openings 46-6 and 46-7, respectively, and pin 42 is inserted through slot 46-4. Nut 48 is then threaded onto threaded shaft 41. If the desired range is from partially open to fully open, the only difference would be locating pin 42 in slot 46-5. Because the mechanical assembly is relatively accurate, the only calibration required is electronic. Specifically, upon assembly in place the signal is measured and set at zero.

When fresh air vent structure 30 is assembled, box 54 containing Hall effect sensor will be located in the space between raised portions 60-3 and 60-4, such that Hall effect sensor 30 is accurately located in fresh air vent structure 30. With shaft 50-1 received in opening 56-1*a* and tangs 56-2 and 56-3 received in openings 46-6 and 46-7, respectively, shaft 50, U-shaped member 56 and door 46 move as a unit. Hall effect sensor 50 is connected to the microprocessor 100 through connector 70. Connector 70 is located in container 12 but extends therefrom to provide a signal to microprocessor 100.

Preferably, when cover 40 is secured to tub 60, the space is filled with foam for insulation. It is believed that illustrating the foam will only obscure details. When foam does fill the space, box 54 serves to isolate the Hall effect sensor 50 from the foam but box 54 is secured in place by the foam. Grommet 64 provides a leak tight seal to prevent foam from leaking from tub 60.

In operation, refrigeration unit 10 will operate under the control of microprocessor 100 to maintain the conditions within a desired narrow range and to provide a history of conditions in container 12, as is conventional. Superimposed upon the automatic control of refrigeration unit 10 provided by microprocessor 100, a manual override is provided by fresh air vent structure 30 by exhausting a portion of the return air circulating in the container 12 and supplying fresh/ambient air as make up air. It should be noted that fresh air vent structure 30 would only be operated to provide fresh air when container 12 has a perishable cargo which produces gas(es). Fresh air vent structure 30 is opened by rotating door 46 and foam 44 which is secured thereto so that they rotate as a unit. Rotation of door 46 is limited by pin 42 which only permits movement of door 46 through the arcs defined by slots 46-4 and 46-5. Rotation of door 46 and foam 44 in an opening direction from a closed position when pin 42 is received in slot 46-4 or when pin 42 is in slot 46-5 at apposition corresponding to the minimal opening will bring ports 46-2 and 44-2 into, or increase, registration with port 40-2 which is always in registration with grilled opening 60-3a. The path serially defined by grilled opening 60-3a, port 40-2, port 44-2 and port 46-2 corresponds to the restricted path 30-1 illustrated in FIG. 2 between the return air and atmosphere. The position of door 46 will define the degree of registration of ports 44-2 and 46-2 with port 40-2 and grilled opening 60-3a. Rotation of door 46 and foam 44 in an opening direction from a closed or minimally open position will also bring ports 46-3 and 44-3 into registration with port 40-3 which is always in registration with grilled opening 60-4a. The registration between ports 46-2 and 40-2 will be the same as the registration between ports 46-3 and 40-3. The path serially defined by port 46-3, port 44-3, port 40-3 and grilled opening 60-4a corresponds to the restricted path 30-2 illustrated in FIG. 2 between ambient and the return air at fan discharge pressure for discharging a portion of the return air.

As door 46 is rotated to open or close fresh air vent structure 30 rotation of door 46 will be as a unit with U-shaped member 54 and shaft 50-1 of Hall effect sensor 50. Rotation of shaft 50-1 of Hall effect sensor 50 produces an output voltage which is proportional to the mechanical position of shaft 50-1 and this information is used by microprocessor 100 to determine the position of door 46. The position of door 46 determines the degree of opening and this information in combination with the speed of evaporator fan 22-1 permits the determining of the amount of fresh air being supplied as make up air.

From the foregoing it should be clear that the present invention permits the position of a fresh air vent to be sensed by an electronic position sensor and stored in a microprocessor 100.

Although a preferred embodiment of the present invention has been illustrated and described, other changes will occur to those skilled in the art. It is therefore intended that the scope of the present invention is to be limited only by the scope of the appended claims.

What is claimed is:

1. A refrigeration container unit including a cargo container having an interior and a refrigeration unit for conditioning and circulating air in said cargo container, said refrigeration unit including an evaporator fan located upstream of an evaporator and a microprocessor for controlling and recording conditions in said cargo container, said container unit further including:

said fan producing a suction pressure upstream thereof and a discharge pressure downstream thereof;

manually operated means for simultaneously controlling all positions between closed and fully open of two flow paths between said interior of said cargo container and ambient atmosphere surrounding said cargo container;

a first one of said two flow paths is for supplying atmospheric air to air circulating in said cargo container and extends from a point which is just upstream of said fan and which is at suction pressure and said ambient atmosphere whereby atmospheric air is supplied to circulating air;

a second one of said two flow paths is for discharging circulating air from said cargo container to said ambient atmosphere and extends to said ambient atmosphere from a point which is just downstream of said fan and which is at discharge pressure;

means for sensing all positions of said manually operated means; and means for continuously providing a signal to said microprocessor indicative of the sensed position sensed by said means for sensing when said manually operated means is in any position and for recording the sensed positions by said microprocessor.

2. The refrigeration container unit of claim 1 wherein said refrigeration unit includes said evaporator fan located in said cargo container at a location intermediate said two flow paths.

3. The refrigeration container unit of claim 1 wherein said manually operated means includes a rotatable member having a pair of radially spaced ports which form portions of said two flow paths.

4. The refrigeration container unit of claim 3 wherein said refrigeration unit includes said evaporator fan located in said cargo container at a location intermediate said two flow paths.

5. The refrigeration container unit of claim 1 wherein said means for sensing is a Hall effect sensor.

6. The refrigeration container unit of claim 5 wherein said manually operated means includes a rotatable member having a pair of radially spaced ports which form portions of said two flow paths.

7. The refrigeration container unit of claim 6 wherein said manually operated means is selectively operable over two ranges of opening.

8. The refrigeration container unit of claim 7 where one of said two ranges of opening is less than the other and extends from closed to partially open.

9. The refrigeration container unit of claim 1 wherein said means for sensing is secured to said manually operated means and rotates therewith.

10. The refrigeration container unit of claim 1 further including means for running said fan whenever said manually operated means is in an open position.

* * * * *